United States Patent
Wischmann et al.

(10) Patent No.: US 6,954,514 B2
(45) Date of Patent: Oct. 11, 2005

(54) X-RAY DETECTOR PROVIDED WITH A HEATING DEVICE

(75) Inventors: Hans-Aloys Wischmann, Aachen (DE); Herfried Karl Wieczorek, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/215,714

(22) Filed: Aug. 9, 2002

(65) Prior Publication Data

US 2003/0043959 A1 Mar. 6, 2003

(30) Foreign Application Priority Data

Aug. 9, 2001 (DE) .......................... 101 39 234

(51) Int. Cl.⁷ ............................................ G01N 23/00
(52) U.S. Cl. ..................... 378/19; 378/98.8; 250/370.15
(58) Field of Search ............. 378/19, 98.8; 250/370.15, 250/370.01, 370.12

(56) References Cited

U.S. PATENT DOCUMENTS 3,735,134 A * 5/1973 Lucas ......................... 250/337
5,248,885 A * 9/1993 Sato et al. ............... 250/370.09
6,411,672 B1 * 6/2002 Sasaki et al. .................. 378/19

FOREIGN PATENT DOCUMENTS

JP 5-180945 7/1993

* cited by examiner

*Primary Examiner*—Craig E. Church
(74) *Attorney, Agent, or Firm*—Douglas E. McKnight

(57) ABSTRACT

The invention relates to an X-ray detector for converting electromagnetic radiation, notably X-rays, into electric charge carriers. The invention also relates to a method of operating an X-ray detector and to a method of manufacturing an X-ray detector. The invention furthermore relates to an X-ray examination apparatus which includes an X-ray detector. In order to reduce image artefacts caused by bright burn effects, it is proposed to add a heating device (7) to an X-ray detector (1) for converting electromagnetic radiation, notably X-rays, into electric charge carriers by means of a converter arrangement, which heating device in accordance with the invention is arranged to apply heat to the converter arrangement (2) during operation of the X-ray detector (1).

18 Claims, 2 Drawing Sheets

X-RAY DETECTOR PROVIDED WITH A HEATING DEVICE

BACKGROUND

The invention relates to an X-ray detector for converting electromagnetic radiation, notably X-rays, into electric charge carriers. The invention also relates to a method of operating an X-ray detector and to a method of manufacturing an X-ray detector. Furthermore, the invention also relates to an X-ray examination apparatus provided with an X-ray detector.

X-ray detectors are used notably in the medical field, that is, especially for X-ray examinations, and serve to form X-ray images of an object (normally a patient) to be examined in the context of usually a medical examination or therapy. An image acquisition system provided with an X-ray detector is used to form images of the object to be examined which is penetrated by the X-rays, said images being output, for example, via a monitor. The X-rays which are incident on the X-ray detector are converted into electric charge carriers in a converter arrangement. The electric charge carriers generated in the converter arrangement are collected in associated capacitances so as to be read out by a downstream electronic read-out circuit arrangement.

Generally speaking, an X-ray detector is constructed in such a manner that the electromagnetic X-rays are incident on a converter arrangement. Depending on the specific construction of the X-ray detector, either a directly converting converter layer in the converter arrangement converts the X-rays into electric charge carriers which are subsequently read out, or a converter arrangement which consists of two converter layers first converts the X-rays into visible light in a scintillator arrangement, after which the visible light is converted into electric charge carriers in a second converter layer which is arranged therebelow, notably a photosensor arrangement, said charge carriers subsequently being read out.

JP 5180945 describes an arrangement in which an infrared lamp applies heat during the manufacturing process of the scintillator layer. This lamp is not included in the X-ray detector but is mounted at a distance from and over the overall arrangement. A layer which is provided on the scintillator layer and absorbs infrared radiation generates heat upon irradiation so that the scintillator is heated. The application of heat is intended to remove irregularities in the scintillator or to homogenize the doping. To this end, the scintillator material is heated after its vapor deposition on a substrate.

Generally speaking, flat dynamic X-ray detectors include a scintillator arrangement of doped cesium iodide (CsI) which exhibits an increased sensitivity to X-rays when exposed to strong X-rays. The relative increase amounts to from 5 to 10% and decays only over a period of several days. This effect is referred to as bright burn, is spatially inhomogeneous and reaches its maximum value in the directly irradiated areas of the X-ray detector. This bright burn effect is very detrimental, because a different number of light quanta is generated from the same number of X-ray quanta in the areas in which such an increased sensitivity occurs, that is, in comparison with areas in which no increase of the sensitivity occurs. This gives rise to undesirable intensification and/or attenuation in the X-ray image.

Image artefacts are also liable to occur in directly converting X-ray detectors in which incident X-rays are converted directly into electric charge carriers by means of a lead oxide or selenium layer.

The bright burn effect cannot be corrected by image post-processing. It can be corrected only by further exposure for the formation of sensitivity correction images, that is, so-called gain images.

In typical circumstances such an increase of the sensitivity may not be noticeable in clinical images. The bright burn effect as caused by an unusual exposure or series of exposures or incorrect operation, however, can be cancelled neither deliberately nor in an accelerated manner.

Moreover, the calibration images used for the sensitivity correction must be updated at regular time intervals. It is by no means possible to wait for possibly present bright burns to decay for these calibration images, because in those circumstances no images can be formed for several days.

The gain images can additionally be used to monitor changes of the scintillator in the context of adaptive calibrations and a remote maintenance service. The order of magnitude of such changes may range from a few millimeters up to the size of the detector. The calibration and monitoring are impeded or even made impossible by the bright burn effect in the case of a spatially inhomogeneous relative increase by several percents.

Deep trap states are probably responsible for the long decay time of the bright burn effect.

SUMMARY OF THE INVENTION

Therefore, it is an object of the invention to provide an arrangement and a device whereby the bright burn effect can be reduced.

This object is achieved by means of an X-ray detector for converting electromagnetic radiation, notably X-rays, into electric charge carriers, which X-ray detector includes a converter arrangement and a heating device which is arranged so as to apply heat to the converter arrangement during operation of the X-ray detector.

The X-ray detector includes a converter arrangement which is formed either by a directly converting converter layer in the case of a directly converting X-ray detector, for example, a layer of PbO or Se, or by a scintillator arrangement and a photosensor arrangement in a second embodiment. The incident X-rays are converted directly into electric charge carriers in the case of directly converting X-ray detectors.

In the case of the second embodiment the X-rays emitted by an X-ray source are incident on the scintillator arrangement in which they are converted into light radiation which is detected by the photosensor arrangement so as to be applied to an electronic read-out circuit arrangement.

In order to eliminate the bright burn effect, the X-ray detector in accordance with the invention includes a heating device which applies, when necessary, heat to the converter arrangement during operation of the X-ray detector.

Heating the scintillator or the directly converting converter layer to a temperature in the range of from 80 to 300° C. releases the charges stored in deep traps. The sensitivity of the X-ray detector is thus homogenized across the entire detector surface.

The heating device in an advantageous embodiment of the invention is arranged over the converter arrangement. It has been found that it is advantageous when the heating device is accommodated in a glass plate which is arranged over the converter arrangement. Consequently, the scintillator arrangement in the second embodiment can be provided on said glass plate without the photosensor arrangement already being connected to the scintillator arrangement.

In conformity with a further embodiment of the invention the heating device is arranged over the glass plate which seals the converter arrangement upwards in the direction of the incident X-rays, thus applying the heat to the converter arrangement. From a manufacturing point of view this implementation is simple, because the converter layer can be deposited on the glass plate (acting as the substrate), that is, independently of the heating device and the photosensor arrangement. The heating device can then be provided on the glass plate during a later step of manufacture. In this arrangement the heating device must be transparent and resistant to X-rays.

It has been found that it is advantageous to arrange the heating device over the converter arrangement, because the heat produced is applied to the converter arrangement notably from above. The photosensor arrangement is sensitive to higher temperatures and upon heating it should possibly be cooled so as to avoid destruction or influencing of its functionality. The arrangement of the heating device over, for example, the scintillator arrangement first of all enables the supply of heat to the scintillator arrangement. Layers which are arranged underneath the scintillator arrangement, for example the thin-film electronic circuitry with a passivation layer, will not be damaged at temperatures of typically up to 200° C.

The heating device in a further group of embodiments is arranged underneath the converter arrangement. This is advantageous notably when the converter arrangement, notably the scintillator arrangement, is vapor deposited directly on the photosensor arrangement.

On the one hand, the heating device can then be integrated in the glass plate on which the photosensor arrangement is provided by means of the thin-film technique.

According to a further possibility the heating device is provided underneath said glass plate with the thin-film electronic circuitry for the photosensor arrangement in the case of the second embodiment or underneath the read-out capacitances in the case of directly converting X-ray detectors.

The construction of the heating device is independent of its location and consists, for example, of resistance wires which are present in or on glass plates. Such wires can be provided in or on the glass plate by means of known manufacturing methods.

The heating device in a further embodiment of the invention is formed by a resistance layer which is transparent to electromagnetic radiation. This enables the heating device to be arranged over the glass plate over the scintillator arrangement or the directly converting converter layer, so that the incident X-rays can traverse the heating device without obstruction.

The heating device reduces the locally higher sensitivity during operation of the X-ray detector. The locally higher sensitivity, which may also be inhomogeneously distributed, can be further reduced again by heating, so that image artefacts as caused by the bright burn effect are eliminated or at least reduced.

The addition of the heating device to the X-ray detector enables a reduction or elimination of the bright burn effect without making it impossible to use the X-ray detector for a prolonged period of time or without it being necessary to remove the X-ray detector so as to replace the scintillator layer or the directly converting converter layer.

The object is also achieved by means of a method of operating an X-ray detector provided with a converter arrangement where a heating device applies heat to the converter arrangement, when necessary, during operation of the X-ray detector.

The heating of the converter arrangement takes place, for example, at regular intervals after a selectable limit dose has been reached for the direct radiation range. This limit dose may be defined on the basis of experimental values or on the basis of test measurements of the image quality in the presence of homogeneous exposure. The duration of the heating period is in the range of from a few minutes (typically ten minutes) to several hours and is dependent on the heating temperature. In addition to such prophylactic heating, the bright burns can also be deliberately erased, for example, immediately before a calibration. Moreover, if so requested by a user, immediate erasure of the bright burns by heating is also possible when the user notices artefacts.

It is a further object of the invention to achieve a uniform structure of the converter material during the manufacture of the converter arrangement and to increase the MTF (Modulation Transfer Function) that can be reached for the X-ray detector overall.

In the case of fast cooling of the vapor-deposited scintillator material, a layer having an undesirable needle structure is formed on the substrate. Using the heating device, heat is applied to the substrate, for example, glass, on which the scintillator arrangement is vapor deposited, that is, prior to the vapor deposition process. It is thus achieved that the first scintillator crystals deposited on the substrate are not cooled too quickly, so that a uniform needle structure is achieved for the scintillator material to be vapor deposited.

In accordance with the invention a substrate glass plate is electrically heated in a controlled manner, for example, via very fine integrated heating wires such as used, for example, in front or rear window heating systems of cars, or via a resistance layer of, for example, transparent ITO which is deposited on the plate.

In the indirect case, where scintillator material is vapor deposited on a separate glass plate, the heating device can be used directly for preheating the substrate, so that the described problem is also solved. Heating of the substrate prior to the deposition can result in homogenization of the converter material also in the case of directly converting X-ray detectors.

In the case of direct vapor deposition, the glass plate on which the thin-film electronic circuitry is arranged is provided with the electric heating facility. The substrate holder should then also include an electrical supply lead or contact so as to enable heating of the substrate prior to the vapor deposition.

The object is also achieved by means of an X-ray examination apparatus which includes an X-ray detector of the described kind.

The following description, claims and accompanying drawings set forth certain illustrative embodiments applying various principles of the present invention. It is to be appreciated that different embodiments applying principles of the invention may take form in various components, steps and arrangements of components and steps. These described embodiments being indicative of but a few of the various ways in which some or all of the principles of the invention may be employed in a method or apparatus. The drawings are only for the purpose of illustrating an embodiment of an apparatus and method applying principles of the present invention and are not to be construed as limiting the present invention.

BRIEF DESCRIPTION OF THE DRAWINGS

The foregoing and other features and advantages of the present invention will become apparent to those skilled in the art to which the present invention relates upon consideration of the following detailed description of apparatus applying aspects of the present invention with reference to the accompanying drawings, wherein.

DETAILED DESCRIPTION

Figure 1:
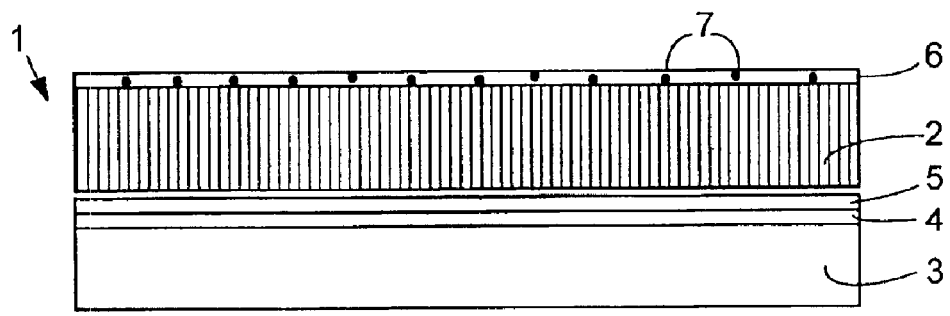
FIG. 1 shows an X-ray detector with heating over the scintillator.

FIG. 1 shows an X-ray detector 1. A glass plate 6 in which the heating device 7 is provided is arranged over the scintillator arrangement 2. The scintillator arrangement 2 is bonded, by way of an adhesive layer 5, to the thin-film glass plate 3 on which there is provided the photosensor arrangement which is covered by a passivation layer 4. The passivation layer 4 is made, for example, of silicon nitride or oxide.

The heating device 7 is formed by small wires of, for example, aluminum which are provided in the glass plate 6. When the cross-section of the aluminum wires is significantly smaller than the pixels of the photosensor arrangement, for example, less than 140 µm, it will not be possible to recognize the heating wire structure in the ultimate X-ray image.

Figure 2:
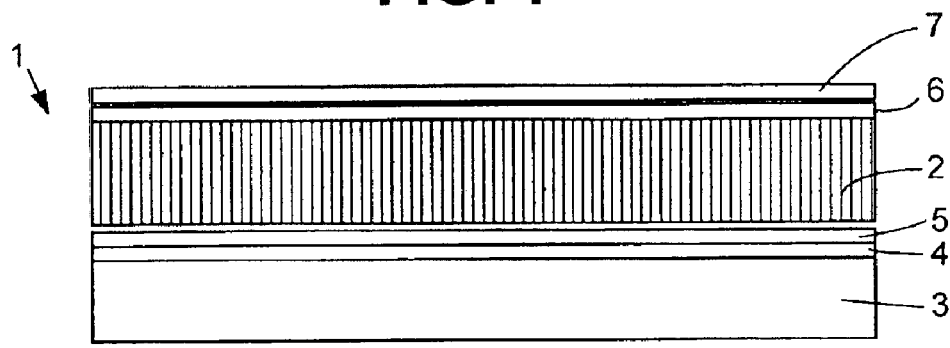
FIG. 2 shows an X-ray detector with resistance heating over the glass plate.

FIG. 2 shows an X-ray detector in which a resistance layer 7 is provided on the glass plate 6, said resistance layer generating heat under the influence of an electric current applied thereto, which heat is applied to the scintillator 2. The remainder of the construction of the detector 1 is as shown in FIG. 1.

Figure 3:
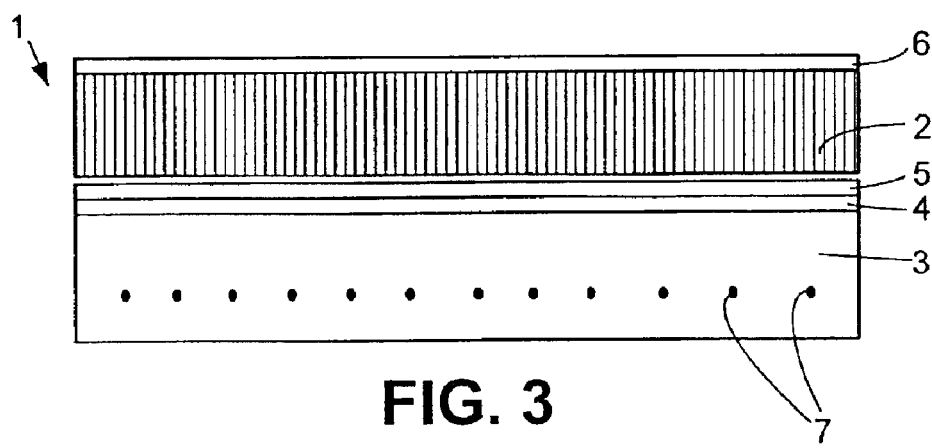
FIG. 3 shows an X-ray detector with a glass plate with thin-film electronic circuitry and resistance wires.

FIG. 3 shows an X-ray detector in which the heating resistance wires 7 are taken up in the glass plate 3 on which the TFT transistors of the photosensor arrangement are provided in the thin-film technique. The remainder of the arrangement of FIG. 3 is the same as that of FIG. 1.

Figure 4:
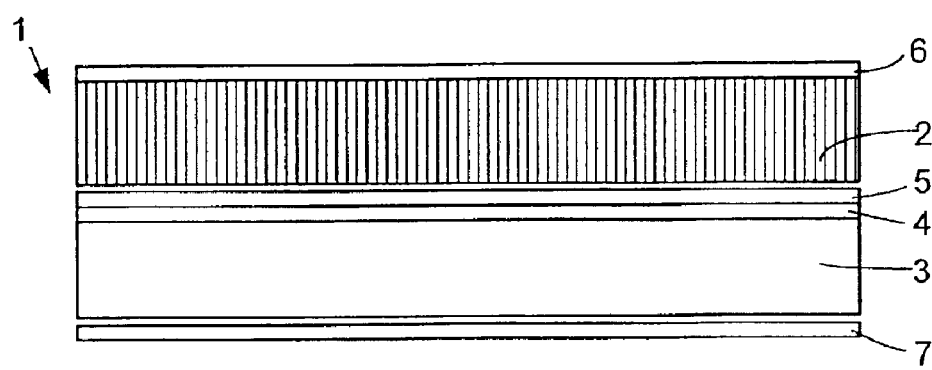
FIG. 4 shows an X-ray detector with resistance heating underneath the thin-film glass plate.

FIG. 4 shows an X-ray detector 1 in which the heating device 7 is provided underneath the thin-film glass plate 3 with the photosensors. The remainder of the arrangement of FIG. 4 is the same as that of FIG. 3.

Figure 5:
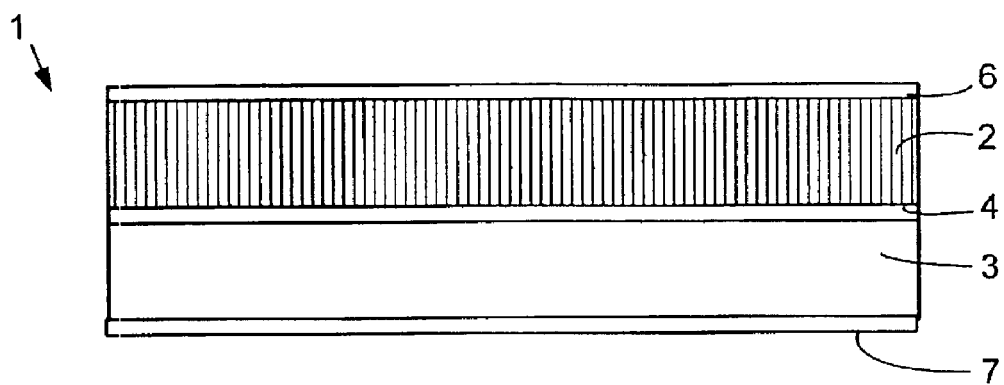
FIG. 5 shows an X-ray detector with a directly vapor-deposited scintillator.

FIG. 5 shows an X-ray detector 1 in which the scintillator arrangement 2 is provided directly over the passivation layer 4 over the thin-film glass plate 3 with the photosensor arrangement. Underneath said thin-film glass plate 3 with the photosensor arrangement there is provided a resistance layer 7 which generates heating which is applied to the X-ray detector arrangement.

In the case of a CsI layer which is vapor deposited directly on the passivation thin-film electronic circuitry it is also possible to replace the upper glass plate 6, used for sealing, by a glass plate 6 with a heating device 7 as shown in FIG. 1.

Figure 6:
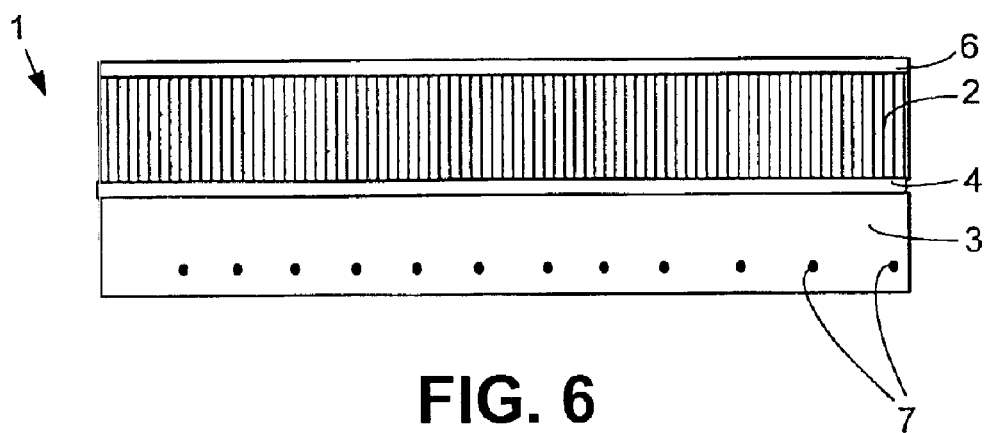
FIG. 6 shows an X-ray detector with a directly vapor-deposited scintillator and heating wires in the glass plate provided with the thin-film electronic circuitry.

FIG. 6 shows an X-ray detector 1 in which the scintillator arrangement 2 is again vapor deposited over the passivation layer 4 over the thin-film glass plate 3 with the photosensor arrangement. The heating wires 7 are embedded in the glass plate 3 which supports the thin-film electronic circuitry. Said heating wires produce heat in response to an appropriate application of current, which heat resets the locally increased sensitivity in the scintillator.

An X-ray detector is provided with a reflector layer which is arranged over the scintillator arrangement whereby light rays which are reflected upwards in the direction of the incident X-rays are reflected again in the direction of the photosensors, thus achieving a higher light efficiency. Such a reflector layer is realized, for example, as a metallic reflector (not shown) which is provided on the lower side of the glass plate 6 and can also be used as a resistance layer.

Prior to the execution of a sensitivity calibration in order to eliminate a visible disturbing bright burn, but also prophylactically, regular heating of the CsI layer can be carried out for deliberate cancellation of the sensitivity increase.

In a further embodiment of the invention it is arranged at the photosensor arrangement is cooled during the heating process. For the arrangements shown in the FIGS. 1 and 2 this is achieved in that a cooling system, for example, in the form of a Peltier element, is provided underneath the glass plate 3. Additionally, water cooling can be applied to the rear of the detector during the heating process.

Additional cooling of the detector housing from the front side is also possible; such a cooling system is then mounted on the X-ray detector, for example, only temporarily, in order to eliminate the bright burn effect.

The invention is of course not limited to the described or shown embodiments, but generally extends to any embodiment, which falls within the scope of the appended claims as seen in light of the foregoing description and drawings. While a particular feature of the invention may have been described above with respect to only one of the illustrated embodiments, such features may be combined with one or more other features of other embodiments, as may be desired and advantageous for any given particular application. From the above description of the invention, those skilled in the art will perceive improvements, changes and modification. Such improvements, changes and modification within the skill of the art are intended to be covered by the appended claims.

Having described a preferred embodiment of the invention, the following is claimed:

1. An X-ray detector for converting electromagnetic radiation emitted from a source of radiation into electric charge carriers, the X-ray detector including:
   a converter arrangement for converting x-rays into electric charge carriers, the converter arrangement including:
      a scintillator and a photosensor arrangement, the scintillator being arranged nearer to the radiation receiving face than the photosensor arrangement;
   a heating device arranged to heat the scintillator to greater than 80° C. to release the charge carriers stored in the X-ray detector; and
   a cooling device arranged to cool the photosensor arrangement during the heating step.

2. The X-ray detector of claim 1, wherein the heating device comprises a resistance layer.

3. The X-ray detector of claim 1, wherein the heating device comprises resistance wires.

4. The X-ray detector of claim 1, wherein the heating device is arranged nearer to the radiation receiving face than to the photosensor arrangement.

5. The X-ray detector of claim 1, wherein the converter arrangement is arranged nearer to the radiation receiving face than the heating device.

6. The X-ray detector of claim 1 wherein the heating device is integrated in a glass plate provided with the photosensor arrangement.

7. An apparatus for converting electromagnetic radiation including X-rays into electric charge carriers, comprising:
   a glass plate;
   a converter with a radiation receiving face for converting electromagnetic radiation into electric charge carriers, and
   a heating device integrated with the glass plate and arranged to heat the converter to intermittently greater than 80° C. during prespecified time intervals,
   wherein the converter includes;
   a scintillator which is heated with the heating device; and
   a photosensor which is cooled with a cooling device, the scintillator being arranged nearer to the radiation receiving face than the photosensor.

8. The apparatus of claim 7, wherein the heating device is arranged nearer to the radiation receiving face than to the photosensor.

9. The apparatus of claim 7 wherein the heating device comprises resistance wires.

10. The apparatus of claim 7 wherein the heating device comprises a resistance layer.

11. The apparatus of claim 7, wherein the heating device is arranged nearer to the radiation receiving face than to the photosensor.

12. The apparatus of claim 7, wherein the converter is arranged nearer to the radiation receiving face than the heating device.

13. The apparatus of claim 7, wherein the heating device is integrated in a glass plate provided with the photosensor.

14. The apparatus of claim 13, wherein the heating device comprises resistance wires.

15. A method for detecting radiation emitted from a radiation source, comprising:
   converting the emitted radiation into electric charge carriers with a detector, which includes a scintillator and a photosensor; and
   intermittently heating the scintillator to greater than 80° C. during prespecified time intervals with a heater; and
   cooling the photosensor.

16. The method of claim 15, wherein the detector includes a directly converting converter layer and further including:
   directly converting the emitted radiation into electric charge carriers.

17. The method of claim 15, further including:
   placing the heater adjacent a radiation receiving side of the detector.

18. The method of claim 15, further including:
   placing the heater on an opposite side of the detector from a radiation receiving side of the detector.

* * * * *